United States Patent [19]
Iverson

[11] Patent Number: 5,930,526
[45] Date of Patent: Jul. 27, 1999

[54] SYSTEM FOR PROGRESSIVE TRANSMISSION OF COMPRESSED VIDEO INCLUDING VIDEO DATA OF FIRST TYPE OF VIDEO FRAME PLAYED INDEPENDENTLY OF VIDEO DATA OF SECOND TYPE OF VIDEO FRAME

[75] Inventor: Vaughn Iverson, Beaverton, Oreg.

[73] Assignee: Intel Corporation, Santa Clara, Calif.

[21] Appl. No.: 08/672,559

[22] Filed: Jun. 28, 1996

Related U.S. Application Data

[60] Provisional application No. 60/010,518, Jan. 24, 1996.

[51] Int. Cl.$^6$ .............................. G06F 13/00; G06F 13/14
[52] U.S. Cl. ......................... 395/853; 395/500; 395/855; 348/385; 348/391; 358/335
[58] Field of Search ..................................... 348/385, 391; 358/335; 364/514 R; 395/853, 855, 500; 382/56

[56] References Cited

U.S. PATENT DOCUMENTS

| | | | |
|---|---|---|---|
| 4,672,444 | 6/1987 | Bergen et al. | 358/140 |
| 4,698,689 | 10/1987 | Tzou | 358/260 |
| 4,751,742 | 6/1988 | Meeker | 382/41 |
| 5,150,432 | 9/1992 | Ueno et al. | 382/56 |
| 5,157,488 | 10/1992 | Pennebaker | 358/133 |
| 5,185,819 | 2/1993 | Ng | 382/56 |
| 5,295,077 | 3/1994 | Fukuoka | 358/479 |
| 5,384,598 | 1/1995 | Rodriguez et al. | 348/384 |
| 5,386,232 | 1/1995 | Golin | 348/391 |
| 5,420,692 | 5/1995 | Lin et al. | 358/426 |
| 5,434,567 | 7/1995 | Mack et al. | 341/50 |
| 5,440,346 | 8/1995 | Alattar et al. | 348/420 |
| 5,488,568 | 1/1996 | Keith | 364/514 R |
| 5,500,678 | 3/1996 | Puri | 348/408 |
| 5,532,833 | 7/1996 | Hong et al. | 358/335 |
| 5,612,742 | 3/1997 | Kause et al. | 348/385 |
| 5,821,986 | 10/1998 | Yuan et al. | 348/17 |

OTHER PUBLICATIONS

"Video Over Wireless", Moura et al, IEEE Personal Communications, pp. 44–54, Feb. 1996.
"Mosaic Based Representations of Video Sequences and Their Applications", Irani et al, IEEE, pp. 605–611, Aug. 1995.
"Multi–Rate Video Transmission Scheme", IBM TDB, vol. 38, No. 12, pp. 59–62, Dec. 1995.

"Coding of Deinterlaced Image Sequences", Vandendorpe et al, IEEE, pp. 943–946, 1994.

"Sequence Retrieval by Contents through Spatio Temporal Indexing", Del Bimbo et al, IEEE, pp. 88–92, Feb. 1993.

"Progressive Transmission of Echocardiographic Images Using the Orthogonal Wavelet Transform", IEEE, pp. 261–264, Mar. 1994.

*Primary Examiner*—Thomas C. Lee
*Assistant Examiner*—Rehana Perveen
*Attorney, Agent, or Firm*—Duane, Morris & Heckscher LLP

[57] ABSTRACT

Different data sets are parsed from a video clip for sequential transmission from one computer system to another computer system over a communications link. The receiving node is able to play back a version of the video clip after receiving each successive data set, with the received data sets being interleaved together for playback. In one embodiment, the video clip is divided into key frames and delta frames and each frame is encoded as a plurality of bands, where each band is part of an independent band sequence. For example, for subsampled YUV data, the Y component plane of each frame may be globally composed into four bands Y0–Y3. Each of the six bands (Y0, Y1, Y2, Y3, U, and V) is then encoded independent of the other bands as part of a separate band sequence. That is, the Y0 band sequence is based on the Y0 band from each frame in the video clip. The encoded video data for the different bands and different frames can then be grouped into different data sets for sequential transmission. For example, the first data set may consist of only the Y0, U, and V data for only the key frames. After this first data set has been received, an initial version of the video clip (albeit of reduced quality) can be played. In addition or alternatively, one or more other versions of the video clip can be played back by interleaving subsequently received data sets with the first data set. The present invention reduces the delay before the user is able to see at least some version of the video clip.

16 Claims, 12 Drawing Sheets

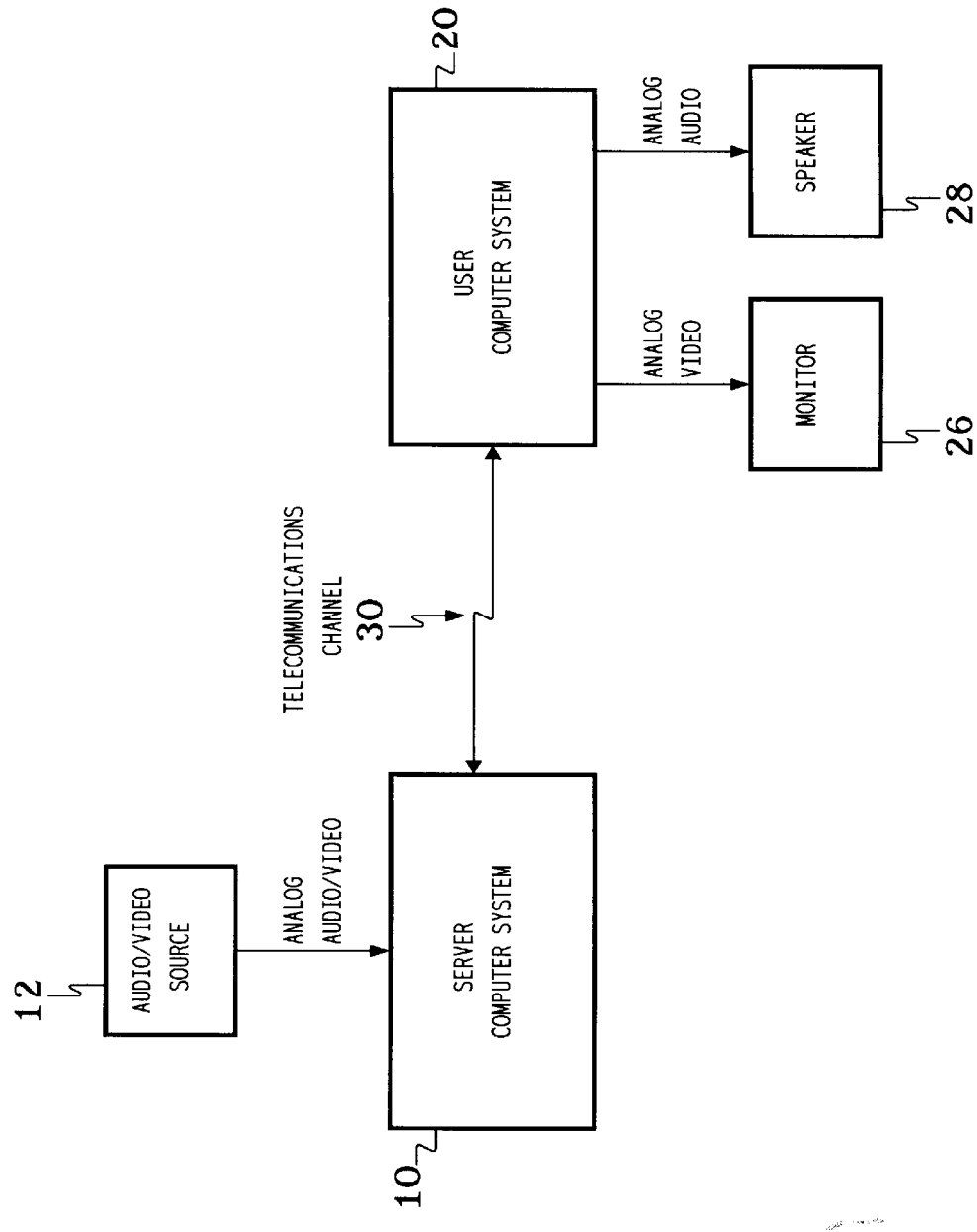
FIG. 1A. COMPUTER NETWORK

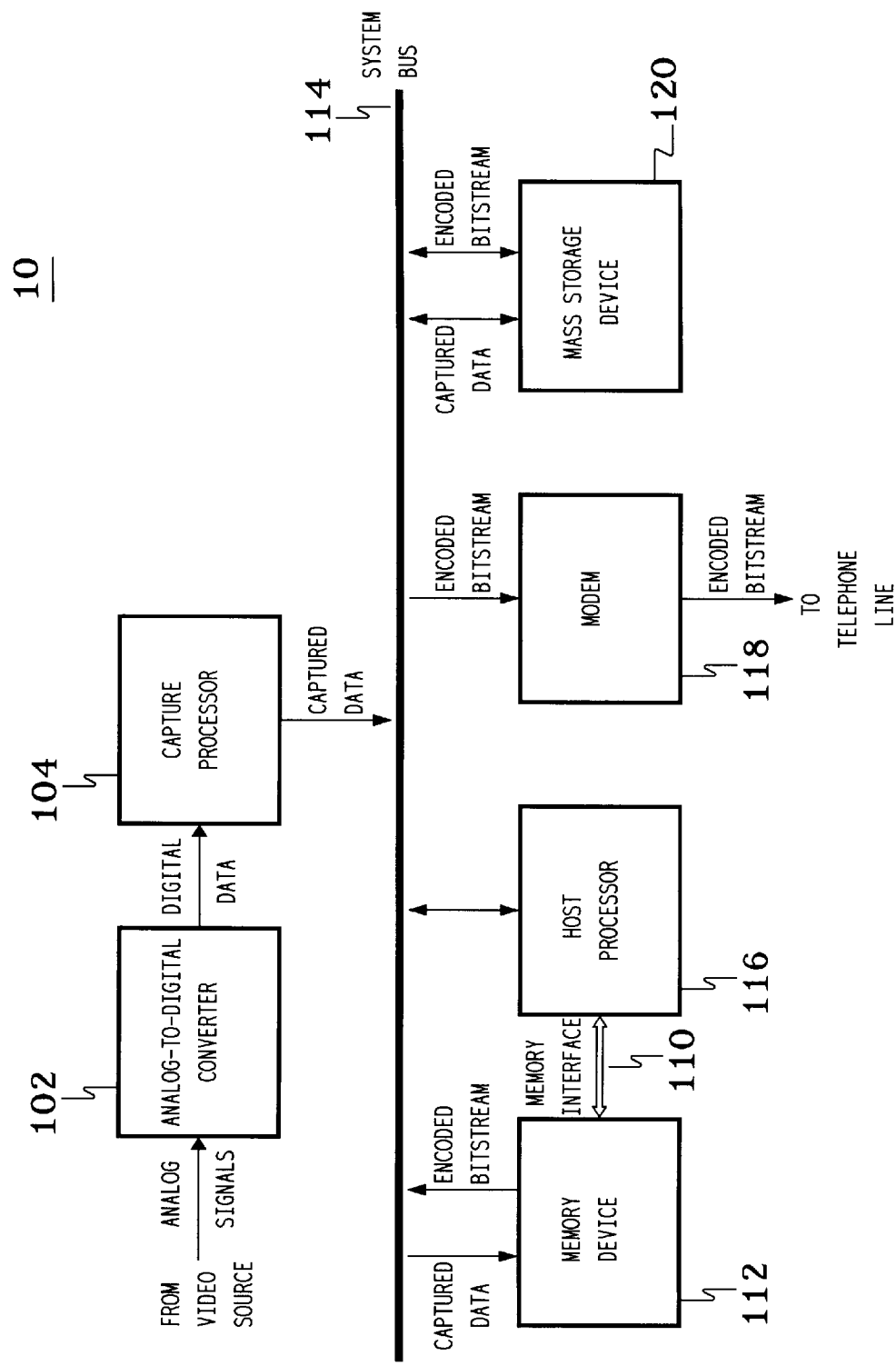
FIG. 1B. ENCODING SYSTEM

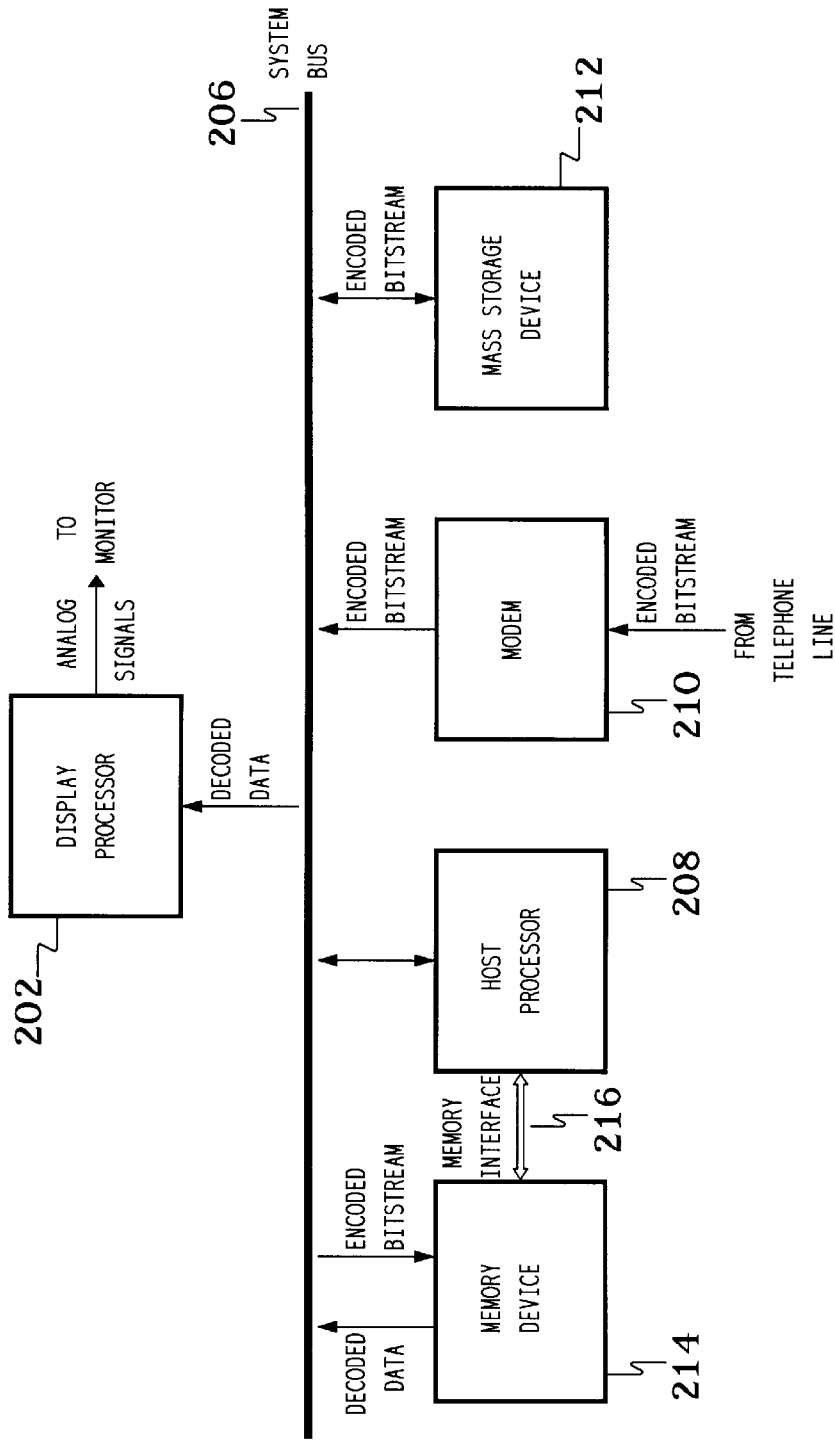
FIG. 2. DECODING SYSTEM

FIG. 3. COMPRESSION PROCESSING
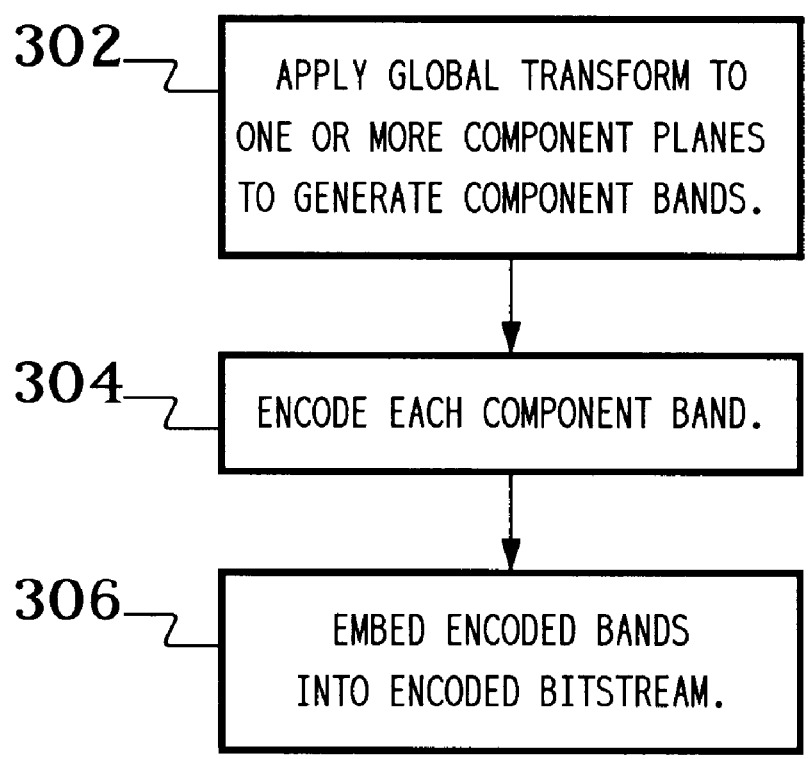

FIG. 5. FRAME ENCODER

FIG. 7. DECOMPRESSION PROCESSING

FIG. 9. BAND DECODER

SYSTEM FOR PROGRESSIVE TRANSMISSION OF COMPRESSED VIDEO INCLUDING VIDEO DATA OF FIRST TYPE OF VIDEO FRAME PLAYED INDEPENDENTLY OF VIDEO DATA OF SECOND TYPE OF VIDEO FRAME

CROSS-REFERENCES TO RELATED APPLICATIONS

This nonprovisional U.S. national application, filed under 35 U.S.C. §111(a), claims, under 35 U.S.C. §119(e)(1), the benefit of the filing date of provisional U.S. national application Ser. No. 60/010,518, filed under 35 U.S.C. §111(b) on Jan. 24, 1996, the teachings of which are incorporated herein by reference. This application is also related to U.S. patent application Ser. No. 08/558,258, filed Nov. 13, 1995 (now U.S. Pat. No. 5,646,618), to U.S. Pat. application Ser. No. 08/568,247, filed Dec. 6, 1995 (now U.S. Pat. No. 5,748,121), and to U.S. patent application Ser. No. 08/671,382, filed Apr. 27, 1996 (now U.S. Pat. No. 5,831,559), the teachings of all three of which are incorporated herein by reference.

BACKGROUND OF THE INVENTION

1. Field of the Invention

The present invention relates to video processing, and, in particular, to the transmission of compressed video data between computer systems.

2. Description of the Related Art

Computer networks, such as the Internet, provide users with the ability to access multimedia information stored in computer memory devices located remotely from each user's computer. For example, a user's computer may be a personal computer (PC) system that requests and receives the multimedia information via standard analog telephone lines using a modem. One such user may request an item from an internet news service (i.e., a Web server). The item may contain one or more audio-video clips, in addition to text and still images. Typically, the audio and video streams for each clip are compressed for storage on the server's computer and eventual transmission to a user's computer. The compressed streams are then decompressed for playback upon receipt by the user's computer.

A typical 30-second video clip may be able to be compressed to about 1400 kilobytes of data. Assuming that the modem communication takes place at a conventional rate of 28.8 Kbits/sec, it would take almost six and a half minutes to transmit just the compressed video data for the clip. When the transmission of the compressed audio data is included in the calculation, the time to transmit the entire audio/video clip would be even longer. Most clips need to be played back at a real-time rate in order for the audio portion to be understandable by the user and for the video portion to be visually acceptable to the user. The limited bandwidth of conventional modems prohibits real-time playback of high-resolution, high-fidelity audio-video clips during real-time transmission of the data (i.e., with the audio/video data being decoded and rendered as they are received over the phone line). As a result, the playback of a clip is typically not started until all of the audio/video data has been received at the user's computer. This means that the user has to wait over six minutes after requesting a typical 30-second audio/video clip before the clip begins to play. This delay can be unacceptable to a user, who wants the clip to be played sooner rather than later.

Some computer systems attempt to ameliorate this problem by decoding the first frame of the 30-second video clip after that portion of the encoded video bitstream has been received and displaying the decoded first frame (for over six minutes) until the entire clip has been received at which time the clip can then be played back for real-time rendering. This does little to satisfy a user who is anxious to see the entire clip, and not just a prolonged view of the first frame.

The present invention is directed to an improved scheme for transmitting video clips between computer systems over transmission paths having limited bandwidth such as standard telephone lines.

Further objects and advantages of this invention will become apparent from the detailed description which follows.

SUMMARY OF THE INVENTION

The present invention is directed to the processing of video signals. According to one embodiment, a first data set is transmitted over a communications link to a receiving node. A second data set is transmitted over the communications link to the receiving node after transmitting all of the first data set over the communications link. The first and second data sets are part of a video sequence. The receiving node is able to play a first version of the video sequence using the first data set. The receiving node is able to play a second version of the video sequence using the first and second data sets, wherein the first and second data sets are interleaved during the playback of the second version.

According to another embodiment, a first data set is received over a communications link from a receiving node. A second data set is received over the communications link from the receiving node after receiving all of the first data set over the communications link, wherein the first and second data sets are part of a video sequence. A first version of the video sequence is optionally played back before receiving all of second data set over the communications link. A second version of the video sequence is optionally played back after receiving all of the second data set over the communications link. The first version of the video sequence is based on the first data set. The second version of the video sequence is based on the first and second data sets, wherein the first and second data sets are interleaved during the playback of the second version.

BRIEF DESCRIPTION OF THE DRAWINGS

Other objects, features, and advantages of the present invention will become more fully apparent from the following detailed description, the appended claims, and the accompanying drawings in which:

FIG. 1A is a block diagram of a computer network, according to one embodiment of the present invention;

FIG. 1B is a block diagram of the video encoding portion of the server computer system of FIG. 1A;

FIG. 2 is a block diagram of the video decoding portion of the user computer system of FIG. 1A;

FIG. 3 is a process flow diagram of the compression processing implemented by the host processor of the encoding system of FIG. 1 for each frame of a video stream;

DETAILED DESCRIPTION

Figure 4:
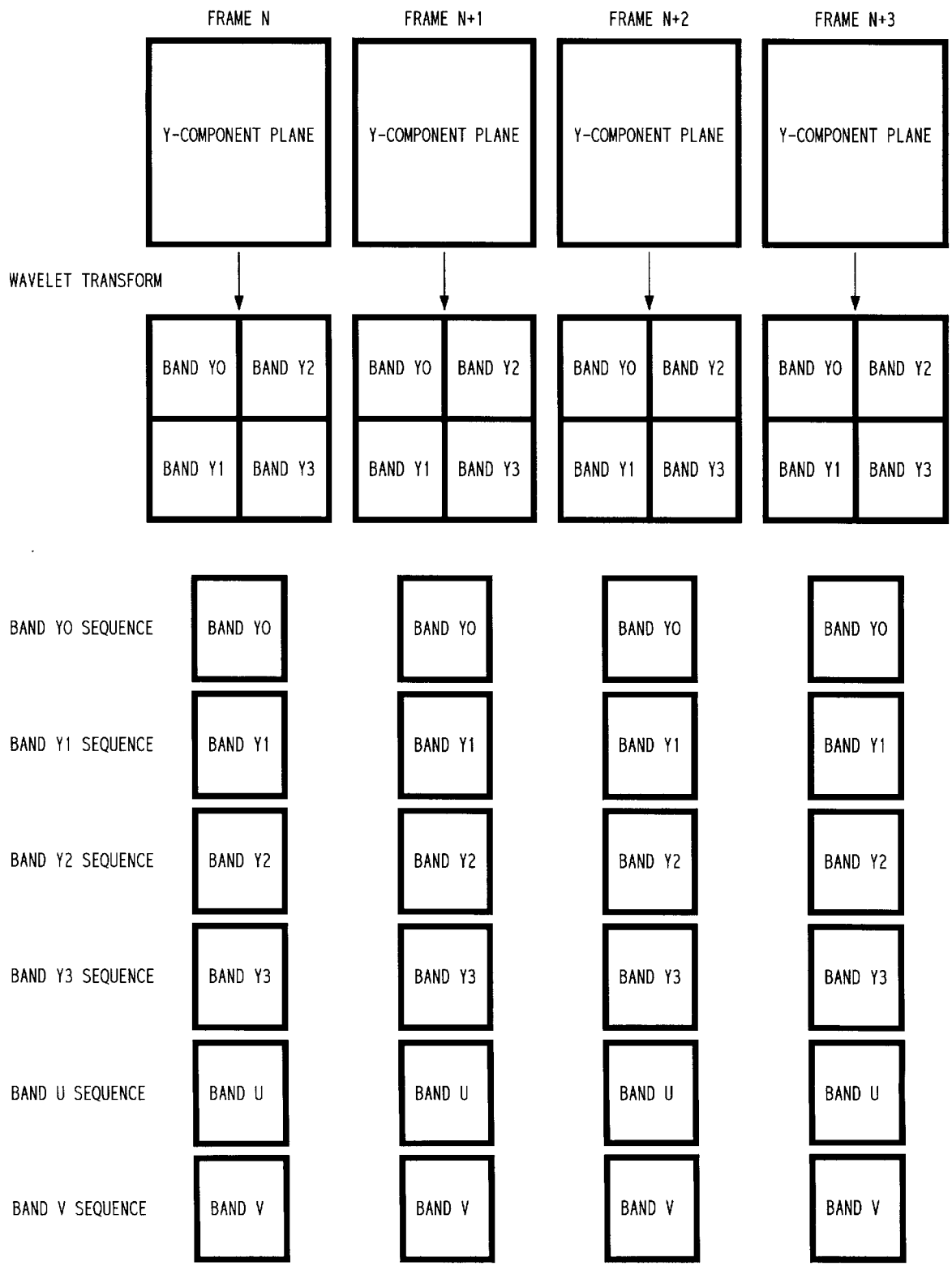
FIG. 4 shows a graphical representation of the six band sequences of the compression processing of FIG. 3.

The present invention is directed to a scheme for transmitting video data over communications links having limited transmission bandwidth, such as standard telephone lines. According to one embodiment, different sets of the compressed video data are transmitted at different times, where the first transmitted set allows the receiver to play back at least some version of the video stream after a relatively short delay and without having to wait for all of the compressed video data to be transmitted.

System Hardware Architectures

Referring now to FIG. 1A, there is shown a block diagram of a computer network, according to one embodiment of the present invention. The computer network comprises server computer system 10 and user computer system 20 which communicate with one another over telecommunications channel 30. Server system 10 may serve for example as an Internet World Wide Web site that provides multimedia information when requested by users of systems, such as user system 20.

The multimedia information offered by server system 10 includes compressed audio/video clips that are transmitted to users over telecommunications channel 30. Server system 10 generates the compressed clips by encoding analog audio-video streams received from audio-video source 12. Audio-video source 12 may be any conventional source of analog audio/video signals such as a video cassette recorder (VCR) or video camera. Server system 10 transmits compressed clips to user system 20 in response to requests transmitted by user system 20 to server system 10 over telecommunications channel 30. User system 20 receives and decodes the compressed clips for playback on monitor 26 and speaker 28. As such, server system 10 may be referred to as encoding system 10 and user system 20 may be referred to as decoding system 20.

In an alternative embodiment of the present invention, the encoding system is different from server system 10. In this embodiment, the encoding system—and not server system 10—generates the compressed audio/video clips, which may be stored for future access by server system 10. Server system 10 simply accesses the compressed clips and processes the compressed data for transmission to user system 20 without having to perform any encoding or compression processing itself. In this embodiment, server system 10 can be a relatively simple computer system compared to those that perform the video compression processing.

Referring now to FIG. 1B, there is shown a block diagram of the video encoding portion of server computer system 10 of FIG. 1A, according to one embodiment of the present invention. Analog-to-digital (A/D) converter 102 of encoding system 10 receives analog video signals from audio/video source 12 of FIG. 1A. A/D converter 102 separates the analog video signal into constituent components (e.g., red (R), green (G), and blue (B)) and digitizes the analog components into digital video component data (e.g., 24-bit RGB component data).

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a YUV9 (i.e., YUV 4:1:0) format, in which every (4×4) block of pixels of the Y-component plane corresponds to a single pixel in the U-component plane and a single pixel in the V-component plane. Capture processor 104 selectively stores the captured data to memory device 112 and/or mass storage device 120 via system bus 114. Those skilled in the art will understand that, for real-time encoding, the captured data may be stored to memory device 112, while for non-real-time encoding, the captured data may be stored to mass storage device 120. For non-real-time encoding, the captured data will subsequently be retrieved from mass storage device 120 and stored in memory device 112 for encode processing by host processor 116.

During encode processing, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. The resulting encoded video bitstream is then stored to memory device 112 via memory interface 110.

Typically, host processor 116 copies the encoded video bitstream to mass storage device 120 for storage until the compressed clip is requested by a user. At that time, host processor 116 retrives the encoded video bitstream from mass storage device 120 for transmission by modem 118 to a remote user, such as via telecommunications channel 30 to user system 20 of FIG. 1A. Under certain circumstances, it may be possible for the encoded video bitstream to be transmitted by modem 118 in real time as the encoded video bitstream is generated by host processor 116. For purposes of this specification, the term "remote" means only that the video data is transmitted from one computer system to another computer system over a communications link. The term "remote" does not necessarily mean that the two computer systems are far apart.

Host processor 116 acts as a data processor and modem 118 acts as a data transmitter. The video encode processing of host processor 116 is described in greater detail later in this specification in the section entitled "Encode Processing". The processing implemented by host processor 116 to organize the encoded video data for transmission is described in greater detail later in this specification in the section entitled "Transmission Processing."

Referring now to FIG. 2, there is shown a block diagram of the video decoding portion of user computer system 20 of FIG. 1A, according to one embodiment of the present invention. User system 20 decodes the encoded video bitstream generated by server computer system 10 of FIG. 1B.

In one mode of operation, the encoded video bitstream is received by modem 210 of user system 20 (in response to a prior request sent to server system 10) and stored to mass storage device 212 via system bus 206. The encoded video bitstream is then transmitted from mass storage device 212 to memory device 214 via system bus 206 for decoding by host processor 208. In another mode of operation, the encoded video bitstream is stored directly to memory device 214 for decoding by host processor 208 as it is received by modem 210.

In either case, host processor 208 accesses the encoded video bitstream stored in memory device 214 via high-speed memory interface 216 and decodes the encoded video bitstream for display. Decoding the encoded video bitstream involves undoing the compression processing implemented by encoding system 10 of FIG. 1B. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206.

Display processor 202 processes the decoded video data for display on monitor 26 of FIG. 1A. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Host processor 208 acts as a data processor and modem 210 acts as a data receiver. The video decode processing of host processor 208 is described in greater detail later in this specification in the section entitled "Decode Processing."

Referring again to FIG. 1B, encoding system 10 may be a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In one embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 may be a general-purpose microprocessor manufactured by Intel Corporation, such as an i486™ microprocessor, Pentium® processor, or Pentium® Pro processor. System bus 114 may be any suitable digital signal transfer medium such as a peripheral component interconnect (PCI) bus. Memory device 112 may be any suitable computer memory device such as one or more dynamic random access memory (DRAM) devices. High-speed memory interface 110 may be any suitable means for interfacing between memory device 112 and host processor 116. Mass storage device 120 may be any suitable means for storing digital data such as a computer hard drive. Modem 118 may be any suitable means for transmitting digital data to a remote computer system such as a conventional modem capable of transmitting and receiving signals over standard telecommunications channels. Those skilled in the art will understand that the encoded video bitstream may be transmitted using other suitable means of transmission such as an integrated services digital network (ISDN), a cable modem, a cellular phone, an RF antenna, a local area network, or a wide area network.

Referring again to FIG. 2, decoding system 20 may be a microprocessor-based PC system similar to the basic PC system of encoding system 10. In particular, host processor 208 may be any suitable means for decoding an encoded video bitstream such as a general purpose microprocessor manufactured by Intel Corporation, such as an i486™ microprocessor, Pentium® processor, or Pentium® Pro processor. System bus 206 may be any suitable digital data transfer medium such as a PCI bus. Mass storage device 212 may be any suitable means for storing digital data such as a computer hard drive. Modem 210 may be any suitable means for receiving the digital data transmitted by modem 118 of encoding system 10. Display processor 202 and monitor 26 of FIG. 1A may be any suitable devices for processing and displaying video images (including the conversion of digital video data to analog video signals) and may be parts of a PC-based display system having a 24-bit PCI graphics board and an RGB monitor.

In one embodiment, encoding system 10 of FIG. 1B and decoding system 20 of FIG. 2 are two distinct computer systems. In another embodiment of the present invention, a single computer system comprising all of the different components of systems 10 and 20 may be used to encode and decode video images. Those skilled in the art will understand that such a combined system may be used to display decoded video images in real-time to monitor the capture and encoding of video streams.

In alternative embodiments in accordance with the present invention, the video encode processing of an encoding system and/or the video decode processing of a decoding system may be assisted by a pixel processor or other suitable component(s) to off-load processing from the host processor by performing computationally intensive operations.

Encode Processing

Referring now to FIG. 3, there is shown a process flow diagram of the video compression processing implemented by host processor 116 of encoding system 10 of FIG. 1B for each frame of a video stream, according to one embodiment of the present invention.

Compression processing for each frame may begin by applying a global transform to one or more of the component planes to decompose the component planes into a plurality of bands (step 302). For example, a forward wavelet transform may be applied to the Y-component plane to globally decompose (i.e., transform) the Y-data into four separate bands of data, thereby producing a total of six bands of data for each frame: four Y-component bands, one U-component band, and one V-component band. FIG. 4 shows a graphical representation of the six band sequences. One possible forward wavelet transform is described in further detail in the '1022 application in the section entitled "Wavelet Transform." Those skilled in the art will understand that the present invention may be implemented with other wavelet transforms or even transforms other than wavelets.

For purposes of this specification, the four Y-component bands are designated Band Y0, Band Y1, Band Y2, and Band Y3. The subsampled U-component plane (which is not wavelet transformed) is designated Band U, and the subsampled V-component plane (which is also not wavelet transformed) is designated Band V.

Encode processing is then applied to each of the bands of the current frame (step 304 of FIG. 3), where each band is part of a distinct band sequence (e.g., see FIG. 4). The encoded bands are then embedded into the compressed video bitstream to complete the compression processing for the current frame (step 306). Steps 302–306 of FIG. 3 are repeated for each frame of the video stream.

Figure 5:
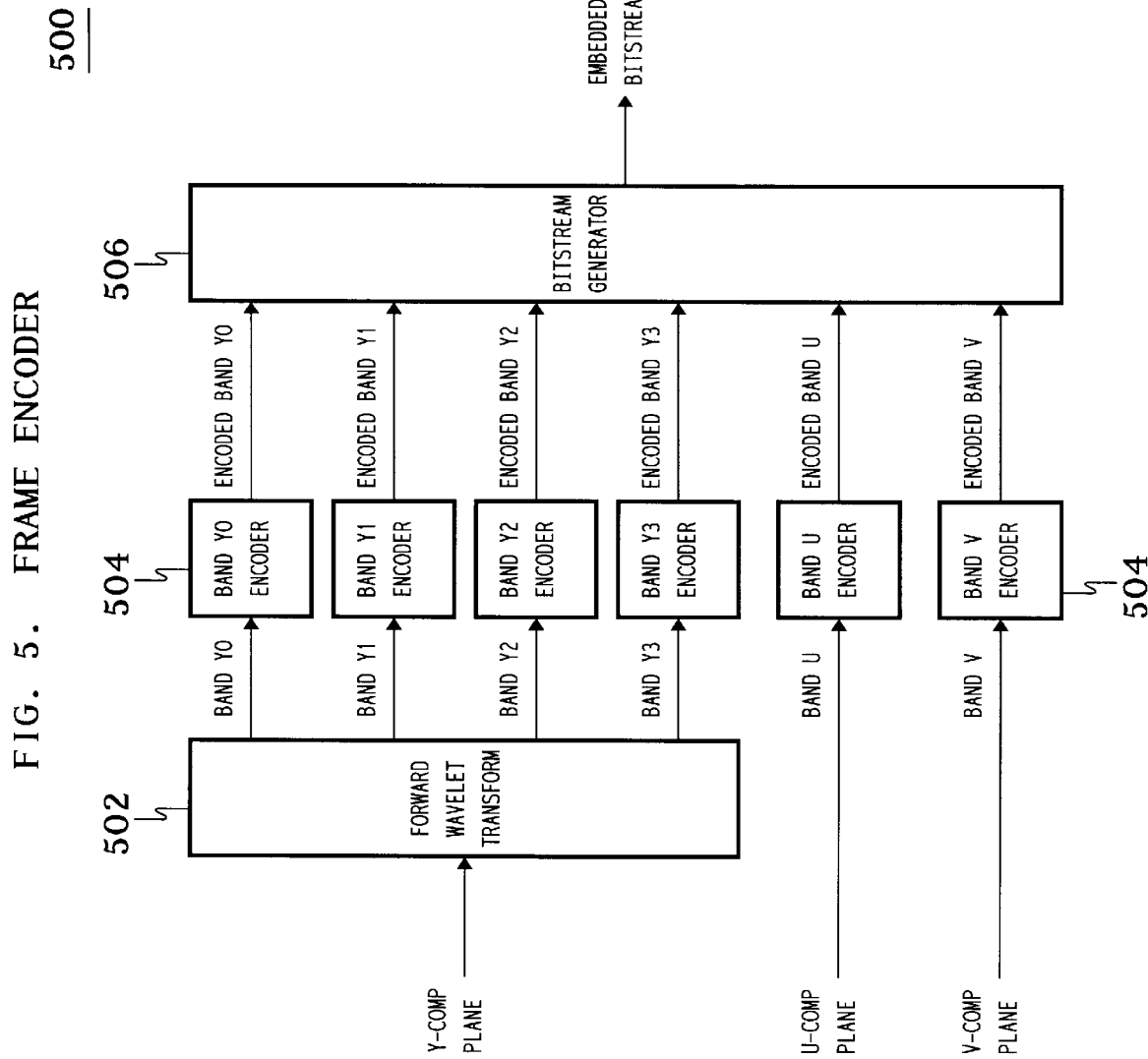
FIG. 5 is a block diagram of a frame encoder that implements the compression processing of FIG. 3.

Referring now to FIG. 5, there is shown a block diagram of frame encoder 500 which implements the compression processing of FIG. 3, when the forward wavelet transform is applied to only the Y-component plane. Transform 502 applies the forward wavelet transform to the Y-component plane of each frame to generate Bands Y0–Y3 (step 302 of FIG. 3). Band encoders 504 encode the six bands of data (step 304 of FIG. 3) and bitstream generator 506 embeds the resulting encoded bands into the encoded video bitstream (step 306 of FIG. 3). In one embodiment, there is a single band encoder 504 that sequentially encodes the different bands.

When encoding video data for storage to mass storage device 120 of FIG. 1B, bitstream generator 506 may store all of the encoded data for each frame of the video sequence in a single contiguous portion of the bitstream. Under this encoding scheme, the encoded data for bands Y0–Y3, U, and V of frame N of FIG. 4 are stored together and distinct from the encoded data for the same bands of the other frames N+1, N+2, and N+3 of FIG. 4. Alternatively, bitstream generator 506 may generate a bitstream that has all of the encoded data for each band stored in a single contiguous portion of the bitstream. Under this encoding scheme, the encoded data for bands Y0 of frames N, N+1, N+2, and N+3 are stored together and distinct from the encoded data for the other bands of those same frames. These storage schemes are discussed in further detail later in the specification in the section entitled "Transmission Processing."

Figure 6:
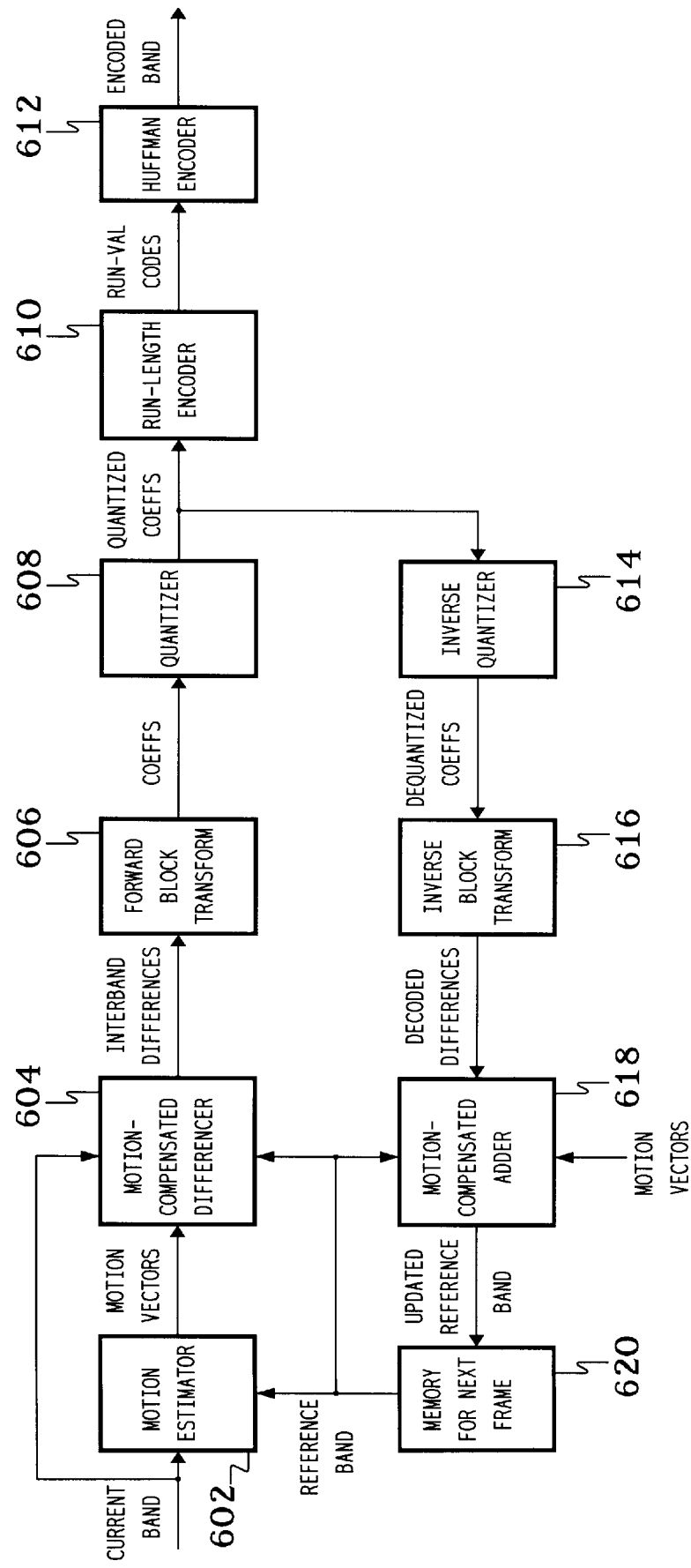
FIG. 6 is a block diagram of each band encoder of FIG. 5 when the coder applies inter-frame encoding to a component band.

Referring now to FIG. 6, there is shown a block diagram of each band encoder 504 of FIG. 5 when band encoder 504 applies inter-frame encoding to a component band, according to one embodiment of the present invention. The inter-frame encoding may be either unidirectional or bidirectional interframe encoding. Band encoder 504 is also capable of applying intraframe encoding, in which case, the motion estimation of 602, the motion-compensated differencing of 604, and the motion-compensated addition of 618 are not performed.

For inter-frame encoding, motion estimator 602 of FIG. 6 performs motion estimation on macroblocks of the current band relative to a reference band to generate a set of motion vectors for the current band. The processing of motion estimator 602 is described in further detail in the '1022 application in the section entitled "Motion Estimation."

Motion-compensated differencer 604 applies the appropriate motion vectors to the reference band to generate a motion-compensated reference band. Differencer 604 also generates interband differences for the current band using the motion-compensated reference band and the current band.

Forward block transform 606 is applied to each block to generate coefficients for the current band. In one embodiment, transform 606 may selectively apply any of the following transforms: a DCT transform, a slant transform, or a Haar transform. The selected transform may be either a one-dimensional or two-dimensional transform, and may differ from band to band. In addition, transform 606 may be disabled for any band, so that the block signals are not transformed before quantization. The processing of forward block transform 606 is described in further detail in the '1022 application in the sections entitled "Block Transform" and "Decode Rate Control." For intraframe encoding, forward block transform 606 is applied directly to the block of band signals, rather than to interframe difference signals.

Quantizer 608 quantizes the coefficients to generate quantized coefficients for the current band. Quantizer 608 applies uniform scalar quantization, wherein each coefficient is divided by a specified integer scale factor. The processing of quantizer 608 is described in further detail in the '1022 application in the section entitled "Adaptive Quantization."

Run-length encoder 610 transforms the quantized coefficients into run-length encoded (RLE) data. In one embodiment, run-length encoder 610 applies adaptive run-length encoding to generate a sequence of run-val pairs for each block of quantized coefficients, where each run-val pair is a value corresponding to the length of a run of zero coefficients (i.e., coefficients that are quantized to zero) followed by a non-zero quantized coefficient. In one embodiment, run length encoder 610 follows an adaptively-generated scan pattern that tends to provide a long run of zero coefficients for the last run of the block. The adaptive run-length encoding of run-length encoder 610 is described in further detail in the '1022 application in the section entitled "Adaptive Run-Length Encoding."

Run-length encoder 610 also applies a run-val mapping table to map the run-val pairs to a sequence of run-val codes. This transformation of run-val pairs to run-val codes is described in further detail in the '1125 application in the section entitled "Run Val Mapping Tables."

Huffman encoder 612 applies Huffman-type entropy (a.k.a. statistical or variable-length) coding to the run-val codes to generate the encoded data for the current band. The processing of Huffman encoder 612 is described in further detail in the '1096 application in the section entitled "Huffman Encoding."

As shown in FIG. 6, band encoder 504 also decodes the encoded band data to update the reference band used in encoding the corresponding band of another video frame. Since the run-length and Huffman encoding of 610 and 612 are lossless encoding steps, the decode loop of band encoder 504 may begin decode processing with inverse quantizer 614, which dequantizes the quantized coefficients to generate dequantized coefficients for the current band.

Inverse block transform 616 applies the inverse of forward block transform 606 to the dequantized coefficients to generate decoded differences for the current band. Motion-compensated adder 618 applies the motion vectors generated by motion estimator 602 to the current reference band to generate motion-compensated reference band data. Adder 618 also performs interband addition using the motion-compensated reference band data and the decoded differences to generate an updated reference band. The updated reference band is stored in memory 620 for use in generating the reference band for encoding the corresponding band of another video frame.

Those skilled in the art will understand that, when decoding the quantized coefficients for intraframe encoded blocks, the outputs of inverse block transform 616 are the decoded pixels for the updated reference band and motion-compensated adder 618 is disabled.

Transmission Processing

As described in the section of the '1022 application entitled "Video Playback Scalability," the video compression scheme of encoding system 10 generates an encoded video bitstream that is scalable. In this scalable bitstream, the encoded video data for each band sequence is independent of the encoded video data for each other band sequence of the same video stream. Two band sequences are said to be independent of one another when each can be decoded without reference to the other. Referring again to FIG. 4, for example, the sequence of encoded data for each of bands Y0–T3, U, and V of frames, N, N+1, N+2, and N+3 can be decoded independent of the encoded data for any of the other band sequences for those same frames. This means that nay one or more band sequences can be dropped without preventing a decoding system from being able to decode of the remaining band sequences.

The present invention exploits this independence between band sequences by transmitting one or more of the band sequences before transmitting one or more of the other band sequences. The present invention also exploits the fact that certain frames in compressed video streams (e.g., key frames) can be decoded independent of other frames (e.g., delta frames). Furthermore, some delta frames (e.g., disposable delta frames) can be removed from the bitstream without affecting the decoding of other frames (e.g., key frames and predictor delta frames).

By transmitting the encoded video data in different sets of data, the time that a user of decoding system 20 of FIG. 1A has to wait before viewing the playback of at least some version of the video clip can be decreased. For example, referring again to FIG. 4, assume that frame N is a key frame and that frames N+1, N+2, and N+3 are delta frames that depend either directly or indirectly on frame N. Assume further that the sequence of frames of FIG. 4 is repeated many times to form a video clip. According to the present invention, different band sequences of different types of frames can be transmitted before the same other band sequences of the same or other types of frames. For example, the compressed data for the video clip could be transmitted in the order of the following four discrete sets of data:

(A) Bands Y0, U, and V of each key frame N;
(B) Bands Y0, U, and V for the delta frames N+1, N+2, and N+3;
(C) Bands Y1, Y2, and Y3 for each key frame N; and
(D) Bands Y1, Y2, and Y3 for the delta frames N+1, N+2, and N+3.

After data set (A) has been received by user system 20, but before any of other data sets have been received, the video clip can be played back by decoding and displaying the available video data (i.e., bands Y0, U, and V of the key frames). This may provide a video display of less than optimal quality, but it will provide at least some resemblance of the full video clip to the user.

The video clip can be replayed after each successive data set has been received to provide video playbacks of increasing quality. Alternatively, the playback of the video clip can be delayed until either the user manually chooses to play the clip or a preselected quality level is available. In any case, the user does not have to wait until all of the video data for the video clip have been received, before playing at least some version of the video clip.

For purposes of this specification, the term "interleaving" refers to the process of combining whatever data sets are available during playback of a video clip to reconstruct a single video sequence that constitutes a version of the original video clip. For example, if only data sets (A) and (B) are available, the during playback, the Y0, U, and V band sequences of the delta frames are interleaved with the Y0, U, and V band sequences of the key frames as appropriate to provide a single video sequence consisting of the Y0, U, and V band sequences of all frames in the video clip. Similarly, if data set (C) is also available, the Y1, Y2, and Y3 band sequences of the key frames are interleaved with the Y0, U, and V band sequences of all of the frames to form a single video sequence consisting of all of the video data for the key frames interleaved with the Y0, U, and V band sequences of the delta frames. thus, interleaving refers to the process of generating a single video sequence from two or more different data sets, where the generation involves either the interleaving (e.g., temporal combination) of different types of frames or the interleaving (e.g., spatial combination) of different bands within a frame or both.

A test was run on a typical 30-second video clip using the same four data sets listed above (although the key frame interval was every 15 frames rather than every 4 frames). The complete encoded bitstream for the video clip was about 1400 Kbytes in size and would therefore have taken almost six and a half minutes to transmit over a 28.8-Kbits/sec modem. In this example, the four different data sets had the following sizes which would take the identified time to transmit over the 28.8-Kbits/sec modem:

| Data Set (A): | 98 Kbytes  | => 27 seconds to transmit  |
|---------------|------------|----------------------------|
| Data Set (B): | 215 Kbytes | => 60 seconds to transmit  |
| Data Set (C): | 284 Kbytes | => 79 seconds to transmit  |
| Data Set (D): | 760 Kbytes | => 211 seconds to transmit |

In this example, rather than having to wait for over six minutes for all of the data to be transmitted, the user only has to wait 27 seconds before being above to play at least some version of the clip. Note that the relatively small size of the first data set may permit the initial playback to be played in real time as the data is transmitted by server system 10 and received by user system 20. In this case, there would be an even smaller delay before the start of playing the initial version of the video clip.

In one embodiment, all of the audio data is transmitted with the first set of video data. In that way, each possible level of video playback can be accompanied by the full audio stream for the clip. It will be understood that when only key frames are displayed, for example, the display is updated at the appropriate rate to synchronize the audio and video streams. In an alternative embodiment, playback based on key frames could simulate the video clip being run in a fast-forward scan mode.

As described in the previous section, host processor 116 of encoding system 10 of FIG. 1B can store the encoded data to mass storage device 120 in different formats when the data are being generated. In one embodiment, the encoded video data is stored in a conventional bitstream format in which all of the data for each frame are stored as a single contiguous portion of the bitstream. In this case, when server system 10 receives a request for a particular video clip, host processor 116 parses the bitstream in order to transmit the sequence of different data sets. If, on the other hand, the encoded video data is stored with each band sequence stored together, host processor 116 only has to select the appropriate band sequences to transmit at the appropriate times. In either case, the overhead needed to organize data for transmission for encoded video data generated using the video compression scheme of FIGS. 3–6 is nominal.

Figure 10:
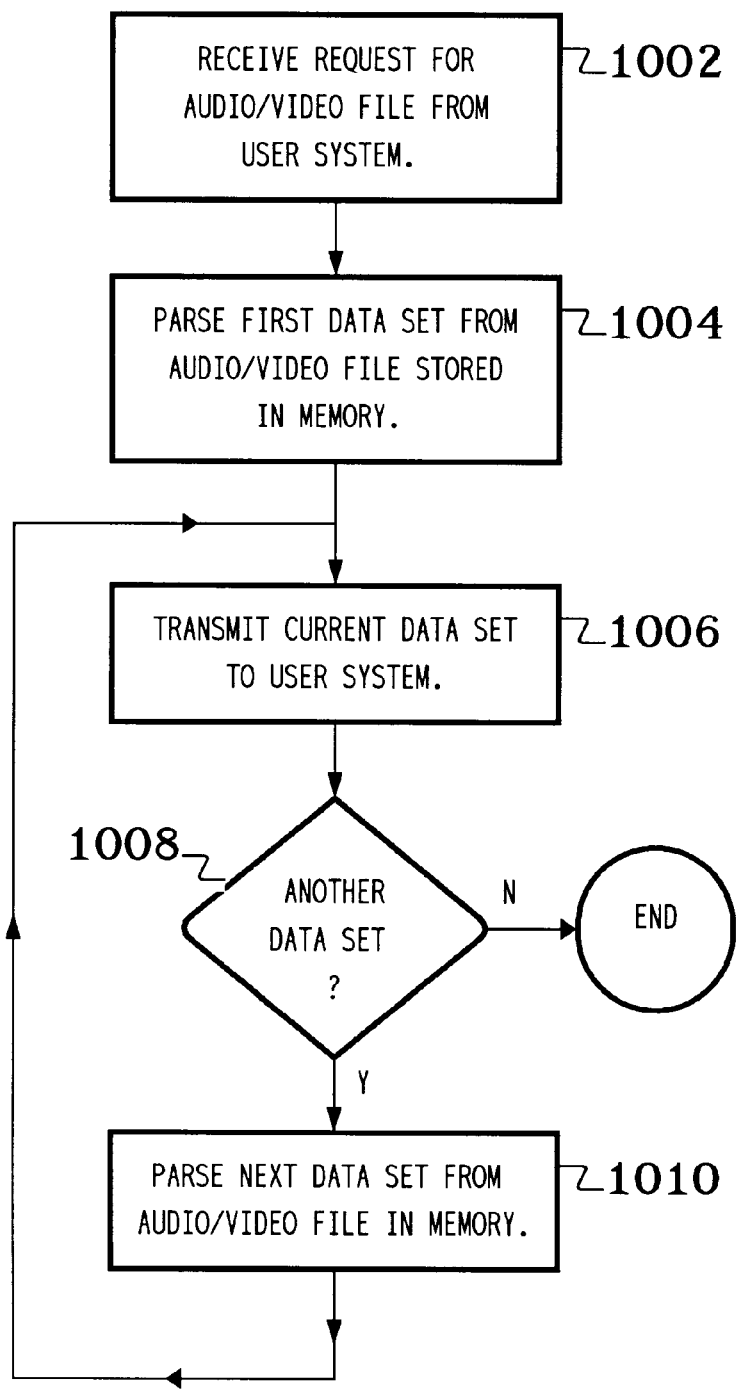
FIG. 10 is a flow diagram of the processing implemented by the host processor of the server system of FIG. 1B in response to a request for a video clip from a remote user.

Referring now to FIG. 10, there is shown a flow diagram of the processing implemented by host processor 116 of server system 10 of FIG. 1B in response to a request for a video clip from a remote user, according to one embodiment. FIG. 10 assumes that the encoded video data is stored in server system 10 in the conventional bitstream format in which all of the encoded data for each frame are stored together as a single contiguous portion of the bitstream. Host processor 116 parses the bitstream into different data set according to some selected or programmed scheme and transmits the data sets to the remote user's computer.

In particular, host processor 116 receives a request for an audio/video file from a remote user (step 1002 of FIG. 10). Host processor 116 then parses the first data set from the audio/video file (step 1004). In one embodiment, the first data set includes the audio file and whatever video band sequences are specified in the transmission scheme. Host processor 116 then causes the current data set to be transmitted to the user (step 1006). If another data set is to be transmitted (step 1008), then host processor 116 parses the next data set from the audio/video file (step 1010). Processing returns to step 1006 to transmit the next data set to the user. Processing continues until no more data sets are to be sent, either because all of the encoded data for the current audio/video file has been transmitted or because the data for a specified quality level has been transmitted.

Decode Processing

Decode processing basically follows the same algorithm no matter which band sequences of the video clip are available during video playback.

Figure 7:
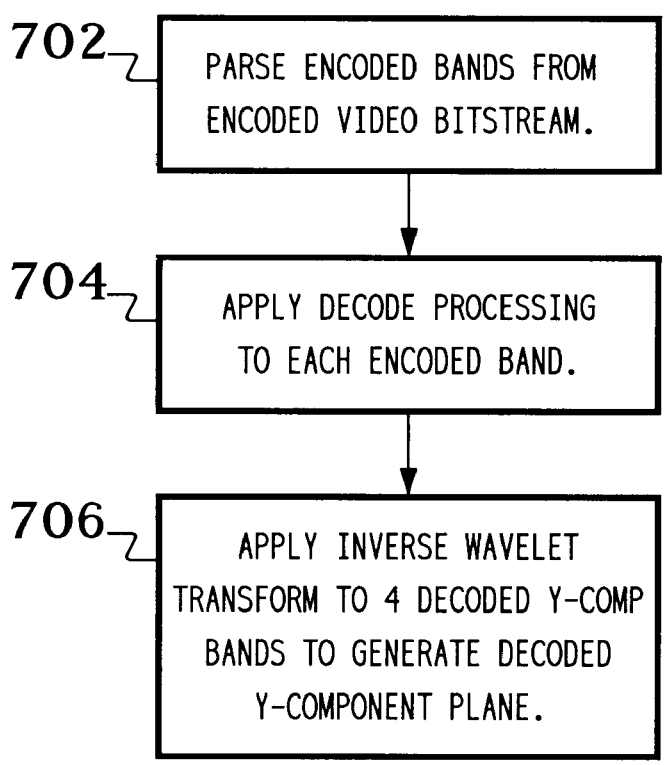
FIG. 7 is a process flow diagram of the decompression processing implemented by the host processor of the decoding system of FIG. 2 for each encoded frame of the encoded video bitstream.

Referring now to FIG. 7, there is shown a process flow diagram of the decompression processing implemented by host processor 208 of decode system 20 of FIG. 2 for each encoded frame of the encoded video bitstream, according to one embodiment of the present invention. Host processor 208 parses the encoded bands from the various data sets of the encoded video bitstream (step 702 of FIG. 7) and applies decode processing to each of the encoded bands (step 704). In the case where the Y-component plane was decomposed into four bands during encoding, an inverse transform is applied to as many of the four decoded Y-component bands as are available to generate the decoded Y-component plane (step 706). The decoded Y-component plane data are then processed with the decoded U-and V-component plane data to generate a decoded video image for display. One possible inverse transform is described in further detail in the '1022 application in the section entitled "Wavelet Transform."

Figure 8:
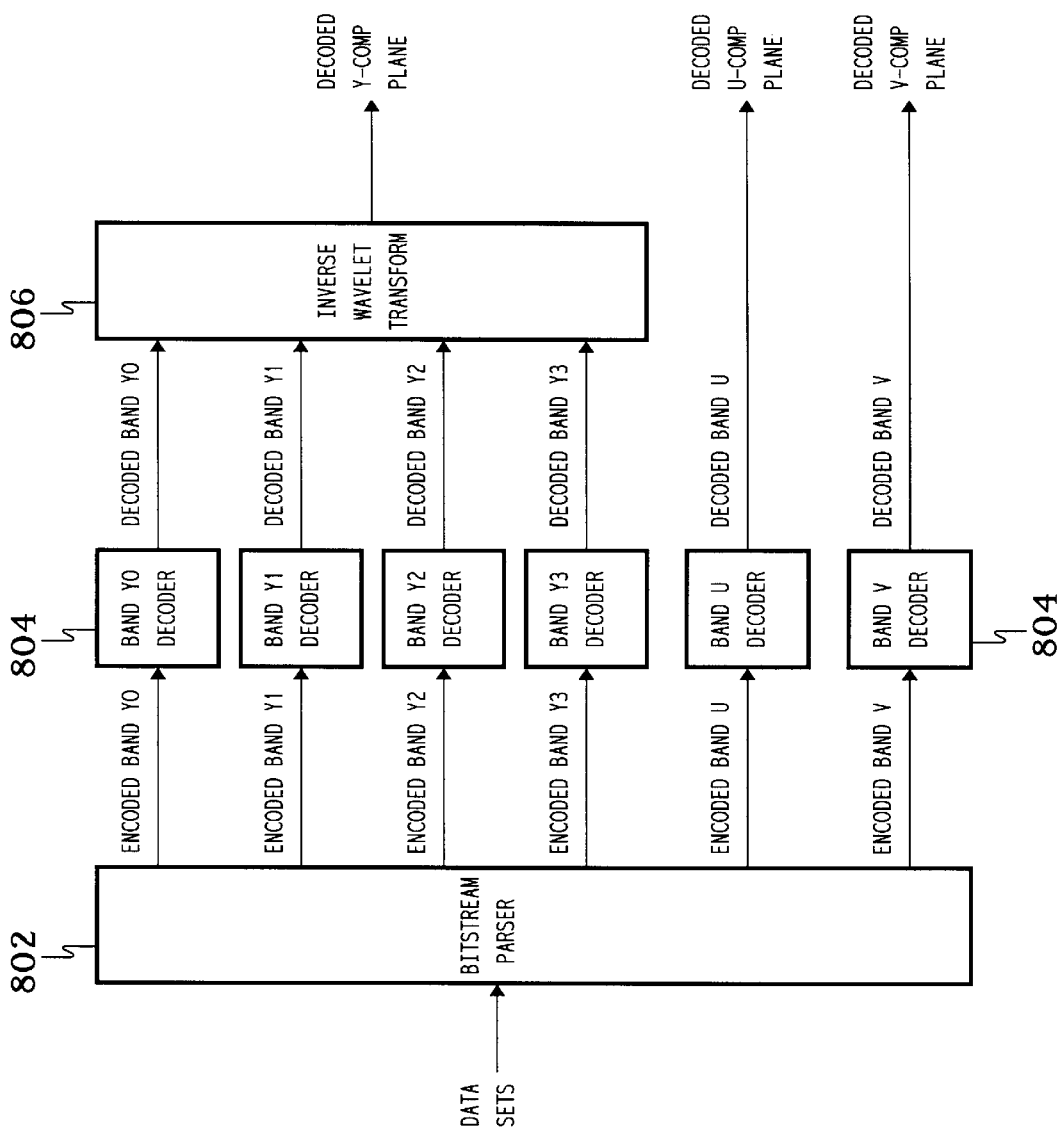
FIG. 8 is a block diagram of a frame decoder that implements the decompression processing of FIG. 7.

Referring now to FIG. 8, there is shown a block diagram of frame decoder 800 which implements the decompression processing of FIG. 7. Bitstream parser 802 parses the embedded bitstream into the encoded band sequences (step 702 of FIG. 7). Band decoders 804 decode the bands of encoded data for each frame (step 704 of FIG. 7) and inverse wavelet transform 806 applies an inverse wavelet transform to the decoded Y-component bands to generate the decoded Y-component plane (step 706 of FIG. 7). In one embodiment, there is a single band decoder 804 that sequentially decodes the different encoded bands.

Figure 9:
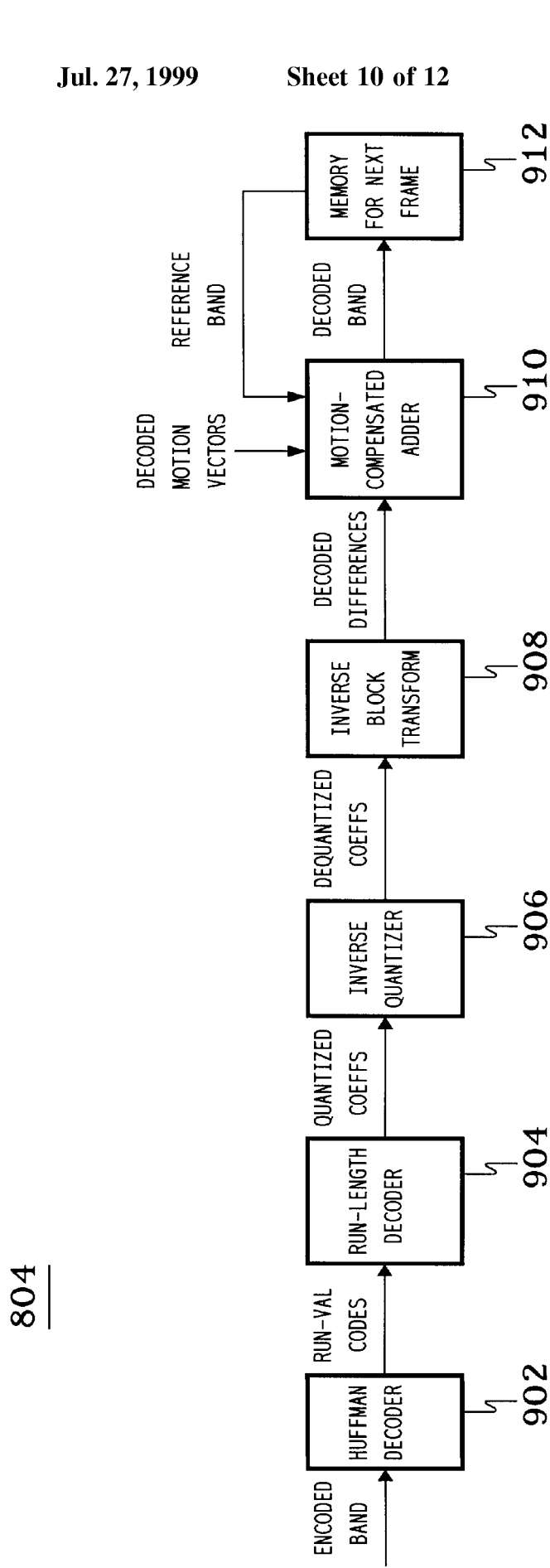
FIG. 9 is a block diagram of each band decoder of FIG. 8 when decoding an inter-frame encoded band of the encoded video bitstream.

Referring now to FIG. 9, there is shown a block diagram of each band decoder 804 of FIG. 8 when decoding an inter-frame encoded band of the encoded video bitstream, according to one embodiment of the present invention. Band decoder 804 of FIG. 9 reverses the encode processing of band encoder 504 of FIG. 6.

In particular, Huffman decoder 902 of FIG. 9 applies statistical decoding to the encoded data for the current band to reconstruct the run-val codes. The processing of Huffman decoder 902 is described in further detail in the '1022 application in the section entitled "Statistical Decoding."

Run-length decoder 904 transforms the run-length codes into quantized coefficients. Inverse quantizer 906 dequan-tizes the quantized coefficients to generate dequantized coefficients. Inverse block transform 908 applies the inverse of forward block transform 606 of FIG. 6 to the dequantized coefficients to generate decoded differences.

Motion-compensated adder 910 applies decoded motion vectors to the reference band to generate motion-compensated reference band data, and performs inter-frame addition using the motion-compensated reference band data and the decoded differences to generate the decoded data for the current band. The decoded band is then stored in memory 912 for use as a reference band for decoding the corresponding band of another video frame. If the decoded band corresponds to a Y-component band, the decoded band data are also used to reconstruct the decoded Y-component plane (step 706 of FIG. 7). Otherwise, the decoded band is either the decoded U- or V-component plane. In any case, the decoded band is used to generate the decoded image for display.

The decoding for intraframe encoded blocks is equivalent to the decoding for inter-frame encoded blocks shown in FIG. 9, except that the motion-compensated addition of 910 is not performed. In that case, the outputs of inverse block transform 908 are the decoded pixels for the updated reference band.

Figure 11:
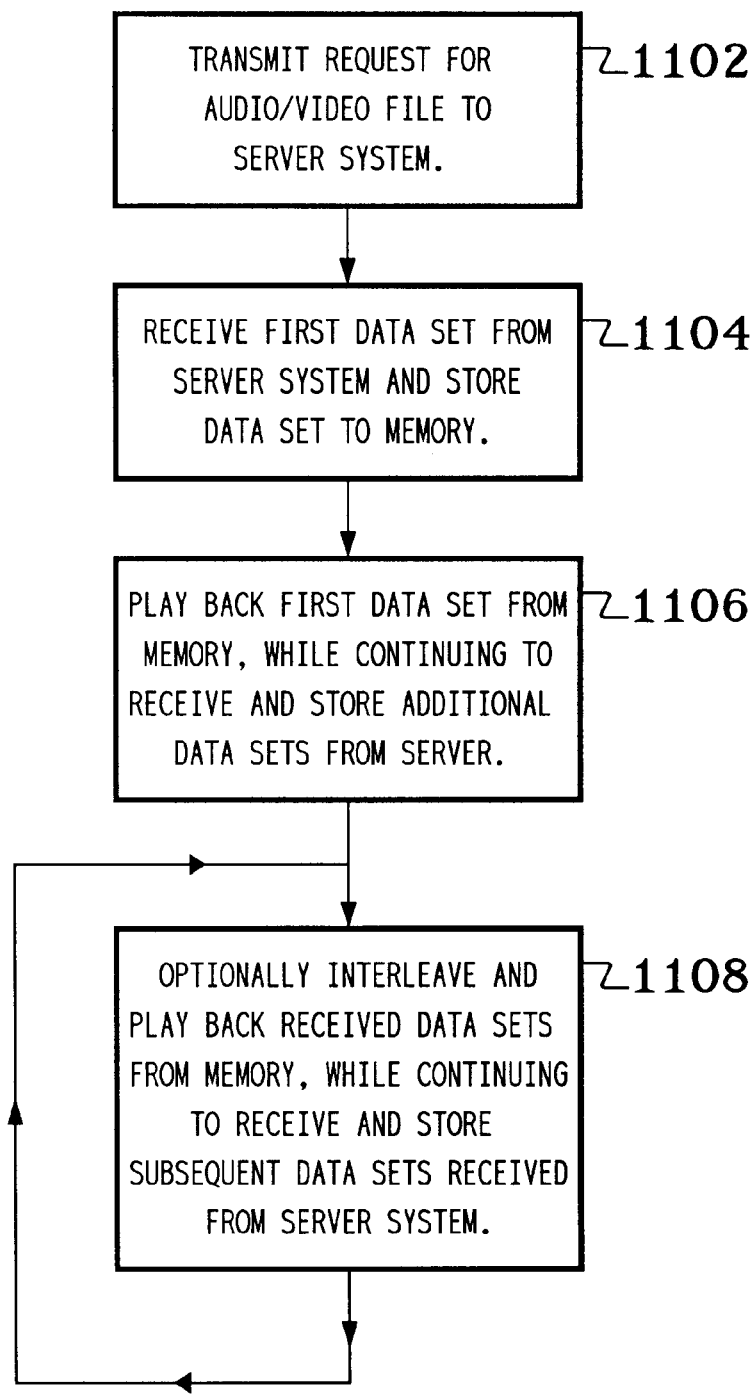
FIG. 11 is a flow diagram of the processing implemented by the host processor of the user system of FIG. 2 to play back the encoded video data received from the server system of FIG. 1B.

Referring now to FIG. 11, there is shown a flow diagram of the processing implemented by host processor 208 of user system 20 of FIG. 2 to play back the encoded video data received from server system 10 of FIG. 1B, according to one embodiment of the present invention. Host processor 208 receives compressed data for an audio/video clip from server system 10 and plays the data one or more times depending upon selections made by the user.

In particular, host processor 208 causes a request for an audio/video file to be transmitted to server system 10 (step 1102 of FIG. 11). After server system 10 responds to the request by starting to transmit data sets for the requested audio/video file, host processor 208 receives the first data set from server system 10 and stores the data set to memory (step 1104). After the entire first data set has been received and stored to memory, host processor 208 begins to play back the first data set from memory, while continuing to receive and store additional data sets from server system 10 (step 1106). After completing the playback of the first data set, host processor 208 optionally interleaves and plays back whatever data sets have currently been received from server system 10, while continuing to receive and store subsequent data sets from server system 10 (step 1108). Step 1108 is repeated until all of the encoded data for the audio/video clip has been received and played one or more times or until the user manually terminates the playback.

Alternative Embodiments

In the example given earlier, there were four specific data sets (A)–(D). Those skilled in the art will understand that the present invention can be implemented using other numbers of data sets and other sets of data within each data set. For example, it may be desirable in the first data set to include only data from the Y0 band sequence. This would reduce the time for transmitting the first data set and provide a black-and-white version of the video clip for playback.

In the video encoding scheme of FIGS. 4 and 5, the global wavelet transform is applied only once to the Y component plane and not at all to the U and V planes. In alternative embodiments, global decomposition can be applied in other patterns. For example, one or more of the Y bands may be further decomposed. Similarly, the U and V planes may be decomposed. No matter what decomposition pattern is applied, the resulting bands may be encoded independent of one another to provide a scalable bitstream.

Although the embodiment of the FIGS. 2–9 relates to compressed video data, the present invention may also be implemented using raw, uncompressed data. In one possible embodiment, different sets of video frames could be transmitted sequentially to achieve the same type of result. For example, a set consisting of frames (0, 8, 16, . . . ) of the video clip could be transmitted, followed by a set consisting of frames (4, 12, 20, . . . ), followed a set consisting of frames (2, 6, 10, 14, 18, 22, . . . ), followed by a set consisting of frames (1, 3, 5, 7, . . . ). The video clip could be played back any time after the first set has been received using whatever sets of frames are currently available.

In the embodiment described above, each band sequence is encoded independent of all other band sequences. As such, each band sequence can be decoded independent of all other band sequences. Although this is the case in some embodiments of the present invention, this complete independence is not required. As long as the received video data can be decoded, the invention can be implemented. For example, assume that there are three data sets: A, B, and C, where data set A can be decoded without reference to either B or C and data set B can be decoded without reference to C. Assume further however that, for decoding, data set B relies on data set A, and data set C relies on data sets A and B. In this case, data sets B and C are not independent of data set A and data set C is also not independent of data set B. Nevertheless, an embodiment of the present invention can be implemented by transmitting the data sets in the sequence "A followed by B followed by C." In that case, the video clip can be played back after only data set A has been received or after only data sets A and B have been received. The absence of pure independence in the data sets of this example merely limits the different sequences for transmitting the data sets under the present invention.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose microprocessor, the program code segments combine with the microprocessor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing video signals, comprising the steps of:

(a) transmitting a first data set over a communications link to a receiving node, the first data set comprising video data of a first type of video frame; and (b) transmitting a second data set over the communications link to the receiving node after transmitting all of the first data set over the communications link, the second data set comprising video data of a second type of video frame, the video data in each of the first and second data sets being separate and distinct from each other, wherein:

the video data of the first type of video frame can be played independently of the video data of the second type of video frame;

the first and second data sets are part of a video sequence, each of the first and second data sets including video data of substantially the same period of time within the video sequence;

the receiving node is able to play a first version of the video sequence using the first data set; and the receiving node is able to play a second version of the video sequence using the first and second data sets, wherein the first and second data sets are temporally interleaved for a playback of the second version with greater video quality than when playing back only the first data set.

2. The method of claim 1, wherein the first type of video frame is a key frame and the second type of video frame is a predictor delta frame.

3. The method of claim 1, wherein the first type of video frame comprises at least one of a key frame and a predictor delta frame and the second type of video frame is a disposable delta frame.

4. The method of claim 1, wherein:

the first data set corresponds to a first set of one or more band sequences of the video sequence; and the second data set corresponds to a second set of one or more other band sequences of the same video sequence covering substantially the same period of time as the first data set.

5. The method of claim 4, wherein:

the first set of band sequences comprises bands Y0, U, and V; and the second set of band sequences comprises bands Y1, Y2, and Y3.

6. The method of claim 1, further comprising the step of:

(c) successfully transmitting one or more additional data sets over the communications link to the receiving node after transmitting all of the first and second data sets over the communications link, wherein:

the additional data sets are part of substantially the same video sequence covering the same period of time as the first data set; and the receiving node is able to play one or more additional data sets, wherein the first and second data sets and the one or more additional data sets are interleaved using temporal and spatial interleaving for playback of the one or more additional versions with greater video quality than when playing back only the first data set.

7. The method of claim 1, wherein the first data set further comprises audio signals and both the first and second versions include playback of the audio signals.

8. A storage medium encoded with machine-readable program code for processing video signals, comprising:

(a) means for causing a machine to transmit a first data set over a communications link to a receiving node, the first data set comprising video data of a first type of video frame; and (b) means for causing the machine to transmit a second data set over the communications link to the receiving node after transmitting all of the first data set over the communications link, the second data set comprising video data of a second type of video frame, the video data in each of the first and second data sets being separate and distinct from each other, wherein:

the video data of the first type of video frame can be played independently of the video data of the second type of video frame, the first and second data sets are part of a video sequence, each of the first and second data sets including video data of substantially the same period of time within the video sequence;

the receiving node is able to play a first version of the video sequence using the first data set; and the receiving node is able to play a second version of the video sequence using the first and second data sets, wherein the first and second data sets are temporally interleaved for playback of the second version with greater video quality than when playing back only the first data set.

9. A method for processing video signals, comprising the steps of:

(a) receiving a first data set over a communications link from a transmitting node, the first data set comprising video data of a first type of video frame;

(b) receiving a second data set over the communications link from the transmitting node after receiving all of the first data set over the communications link, the second data set comprising video data of a second type of video frame, the video data in each of the first and second data sets being separate and distinct from each other, wherein the video data of the first type of video frame can be played independently of the video data of the second type of video frame, the first and second data sets are part of a video sequence, each of the first and second data sets including video data of substantially the same period of time within the video sequence;

(c) optionally playing back a first version of the video sequence before receiving all of the second data set over the communications link; and (d) optionally playing back a second version of the video sequence after receiving all of the second data set over the communications link, wherein:

the first version of the video sequence is based on the first data set without the second data set; and the second version of the video sequence is based on the first and second data sets, wherein the first and second data sets are temporally interleaved for playback of the second version with greater video quality than when playing back only the first data set.

10. The method of claim 9, wherein the first type of video frame is a key frame and the second type of video frame is a predictor delta frame.

11. The method of claim 9, wherein the first type of video frame comprises at least one of a key frame and a predictor delta frame and the second type of video frame is a disposable delta frame.

12. The method of claim 10, wherein:

the first data set corresponds to a first set of one or more band sequences of the video sequence;

the second data set corresponds to a second set of one or more other band sequences of substantially the same video sequence covering the same period of time as the first data set.

13. The method of claim 12, wherein:

the first set of band sequences comprises bands Y0, U, and V; and the second set of band sequences comprises bands Y1, Y2, and Y3.

14. The method of claim 9, further comprising:

(e) successively receiving one or more additional data sets over the communications link from the transmitting node after receiving all of the first and second data sets over the communications link, wherein the additional data sets are part of the same video sequence covering substantially the same period as the first data set; and (f) optionally playing back one or more additional versions of the video sequence using the first and second data sets and the one or more additional data sets, wherein the first and second data sets and the one or more additional data sets are interleaved using temporal and spatial interleaving for playback of the one or more additional versions with greater video quality than when playing back only the first data set.

15. The method of claim 9, wherein the first data set further comprises audio signals and both the first and second versions include playback of the audio signals.

16. A storage medium encoded with machine-readable program code for processing video signals, comprising:

(a) means for causing a machine to receive a first data set over a communications link from a transmitting node, the first data set comprising video data of a first type of video frame;

(b) means for causing the machine to receive a second data set over the communications link from the transmitting node after receiving all of the first data set over the communications link, the second data set comprising video data of a second type of video frame, the video data in each of the first and second data sets being separate and distinct from each other, wherein the video data of the first type of video frame can be played independently of the video data of the second type of video frame, and the first and second data sets are part of a video sequence, each of the first and second data sets including video data of substantially the same period of time within the video sequence;

(c) means for causing the machine to optionally play back a first version of the video sequence before receiving all of the second data set over the communications link; and (d) means for causing the machine to optionally play back a second version of the video sequence after receiving all of the second data set over the communications link, where:

the first version of the video sequence is based on the first data set; and the second version of the video sequence is based on the first and second data sets, wherein the first and second data sets are temporally interleaved for playback of the second version with greater video quality than when playing back only the first data set.

* * * * *